United States Patent [19]
Sakane

[11] Patent Number: 4,612,589
[45] Date of Patent: Sep. 16, 1986

[54] HEAD BASE DRIVE MECHANISM OF CASSETTE TAPE PLAYER
[75] Inventor: Ikuo Sakane, Tokorozawa, Japan
[73] Assignee: Pioneer Electronic Corporation, Tokyo, Japan
[21] Appl. No.: 626,794
[22] Filed: Jul. 2, 1984
[30] Foreign Application Priority Data
Jun. 30, 1983 [JP] Japan ................................. 58-116860
[51] Int. Cl.[4] ........................ G11B 5/008; G11B 15/00
[52] U.S. Cl. ....................................... 360/90; 360/137
[58] Field of Search .................... 360/90, 69, 105, 137
[56] References Cited
U.S. PATENT DOCUMENTS
4,167,764  9/1979  Hanajima et al. ................... 360/90
4,420,783 12/1983  Suezawa et al. ................. 360/90 X
4,507,694  3/1985  Hosono et al. ................. 360/137 X Primary Examiner—John H. Wolff
Attorney, Agent, or Firm—Armstrong, Nikaido, Marmelstein & Kubovcik

[57] ABSTRACT

A novel structure concerning the head base drive mechanism in a cassette tape player. In order to drive the head base from the stop position to the playback position, a first cam provided on a cam gear is used to actuate the head base in cooperation with the capstan gear. For driving the head base from the playback position to the stop position, a leaf spring attached to the chassis is used. In order to assist the leaf spring, a second cam is provided on the head base. This second cam is located on the head base playback side of the cam follower and has a profile increasing closer to a center of the cam gear as said cam gear rotates to actuate the drive pin toward the stop position of the head base.

4 Claims, 7 Drawing Figures

HEAD BASE DRIVE MECHANISM OF CASSETTE TAPE PLAYER

BACKGROUND OF THE INVENTION

The present invention relates to an improvement of a head base drive mechanism in a tape player for bringing the head into contact with a cassette tape held in a cassette receiving chamber during the recording and playback operations and for moving the head away from the tape during fast forwarding and rewinding operations or during the tape stop.

Heretofore, as a head base drive mechanism of this type, there has been known such a device as shown in FIGS. 1 to 4.

Such a conventional device will now be explained with reference to those figures. The numeral 1 denotes a trigger plunger attached to a chassis A, the trigger plunger 1 being connected to one end of a trigger lever 3 which is supported pivotably by a shaft 2 on the chassis A.

The numeral 4 denotes a capstan shaft mounted to the chassis. On said capstan shaft is fixedly mounted a flywheel 5. The flywheel 5 is adapted to be rotated by a belt 8 which is stretched between a motor pulley 7 mounted on a shaft of a motor 6 and the flywheel 5. On the capstan shaft 4 is also coaxially fixed a capstan gear 9.

The numeral 10 denotes a cam gear in the form of a rotor adapted to engage the capstan gear 9. Said cam gear 10 is mounted to said chassis A to come into mesh engagement with said capstan gear and has two notched sections 10a and 10b therearound. Said cam gear 10 is further provided with a cam 11 and a pin 12 thereon. Said cam 11 is of a generally oval shape having a substantially large diameter section and a substantially smallest diameter section and is fixed to the cam gear on a head-base-stop side of the drive pin which will be explained later.

The numeral 14 denotes a trigger spring anchored at one end thereof to the chassis A. When the notched section 10a of the cam gear 10 moves to the position to face the capstan gear 9, the cam gear 10 takes a first position as shown in FIG. 1. In this position, the rotation of the flywheel 5 is adapted to be transmitted to the cam gear 10 since the pin 12 in contact with the trigger spring 14 is urged by the latter to rotate the cam gear 10 in the arrow-marked direction.

Likewise, when the notched section 10b is in the position to face the capstan gear 9, the cam gear 10 takes a second position as shown in FIG. 3. In this position, the pin 12 comes into contact with the trigger spring 14 to receive the force to further rotate the cam gear 10 in the arrow-marked direction.

The numeral 15 denotes a head base equipped with a head (not shown). The head base 15 is slidably movable with respect to the chassis A between a playback position and a stop position. Said head base 15 taking the playback position is urged downward in the drawing toward the stop position by means of a head base return spring 16 which is anchored at one end thereof to the chassis A. Consequently, the head moves away from the tape. On the head base 15 is fixedly erected a cam follower in the form of a drive pin 17 adapted to contact the cam 11.

Further, one end of a trigger lever spring 18 is anchored to the trigger lever 3 whereas the other end is fixed to the chassis. A lug 10c is formed on the cam gear 10. Where a play button (not shown) for recording and playback of the tape recorder is not operated, the trigger plunger 1 is not supplied with an electric current. Therefore, trigger lever 3 is pulled by the trigger lever spring 18 and the lug 10c of the cam gear 10 is locked by a retaining portion 3a of the trigger lever 3 at the first position as shown in FIG. 1 such that the cam gear 10 cannot rotate in the above direction.

When the play button is operated to supply an electric current through the trigger plunger 1, the trigger lever 3 pivots against the trigger lever spring 18 to bring the lug 10c of the cam gear 10 into abutment with an abutting portion 3b of the trigger lever 3 after said retaining portion 3a releases the lug 10c such that the rotation of the cam gear 10 is stopped to take the second position as shown in FIG. 3.

While the tape recorder is in neither recording nor reproducing operation, the notched section 10a of the cam gear 10 is in the position to face the capstan gear 9 and the lug 10c is retained by the retaining portion 3a of the cam lever 3, thus preventing the rotating of the cam gear 10, as shown in FIG. 1.

In this state, if the play button for recording and playback is operated, the trigger plunger 1 is supplied with an electric current and energized such that the trigger lever 3 is pulled to pivot and its retaining portion 3a is disengaged from the lug 10c. The cam gear 10 starts rotating since the pin 12 is urged in the arrow-marked direction by the trigger spring 14 as previously noted. As a result, the cam gear 10 comes into mesh engagement with the capstan gear 9 to maintain the rotation.

Since the cam 11 also rotates together with the cam gear 10 until it contacts and pushes the drive pin 17, the head base 15 is pushed toward the playback position against the head base return spring 16, thereby causing the head to contact the tape.

When the movement of the head base 15 due to the continued rotation of the cam gear 10 is finished, the notched section 10b of the cam gear 10 arrives at the position to face the capstan gear 9 as shown in FIG. 3 with the result that the rotation of the capstan gear 9 is no longer transmitted to the cam gear 10.

At this time, the pin 12 pushes the trigger spring 14 through its way onto the opposite side of its dead point. As a result, it begins to undergo the urging force in the arrow-marked direction of the cam gear 10 until the lug 10c abuts the abutting portion 3b of the trigger lever 3 to stop the rotation of the cam gear 10 such that the head is kept in contact with the tape at the playback position.

Next, when the stop button is pressed for stopping recording and playback, the supply of electric current to the trigger plunger 1 is cut off such that trigger lever 3 is pulled by the trigger lever spring 18 to pivot and disengage its abutting portion 3b from the lug 10c, as shown in FIG. 4. Consequently, the trigger spring 14 causes the pin 12 to rotate the cam gear such that the toothed portion of the cam gear 10 is brought into engagement with the capstan gear 9 to rotate the same.

When the cam 11 rotates along with the cam gear 10 in this situation, said cam 11 no longer actuates the drive pin 17, since the substantially smallest section of the cam 11 comes into facing relation with the drive pin 17. As a result, the head base 15 is brought downward in the drawing by the head base return spring 16.

Then, as the cam gear 10 continues to rotate, its notched section 10a arrives at the position to face the capstan gear 9, so that the rotation of the capstan gear 9 is no longer transmitted to the cam gear 10, and the pin 12 comes into contact with the trigger lever spring 14 and begins to undergo the urging force in the rotational direction past its bottom dead center by means of the trigger lever spring 14, whereupon the lug 10c is retained by the retaining portion 3a of the trigger lever 3 as shown in FIG. 1 again.

In this way, the tape recorder head contacts and moves away from the tape between the record/-playback position and the stop position. In such a conventional device, however, it is only the force of the head base return spring 16 that actuates the head base 15 for stopping recording or playback operation. In case where the force of the head base return spring 16 is made stronger to overcome the sliding loss during the head base movement away from the tape and to cope with load of the head lead wire, increasing load due to hardened lubricating oil under low temperatures, etc., the force for actuating the head base 15 in the opposite direction for recording or playback is required to be larger. In such a design, the components are subject to wear sooner or the speed of the rotating flywheel is apt to drop.

If the force of the head base returning spring 16 is not made stronger on the other hand, the head base 15 may not go downward in the drawing in the event of an abnormal load thus making it impossible to take out the cassette from the player.

DETAILED DESCRIPTION OF THE EMBODIMENTS

Figure 1:
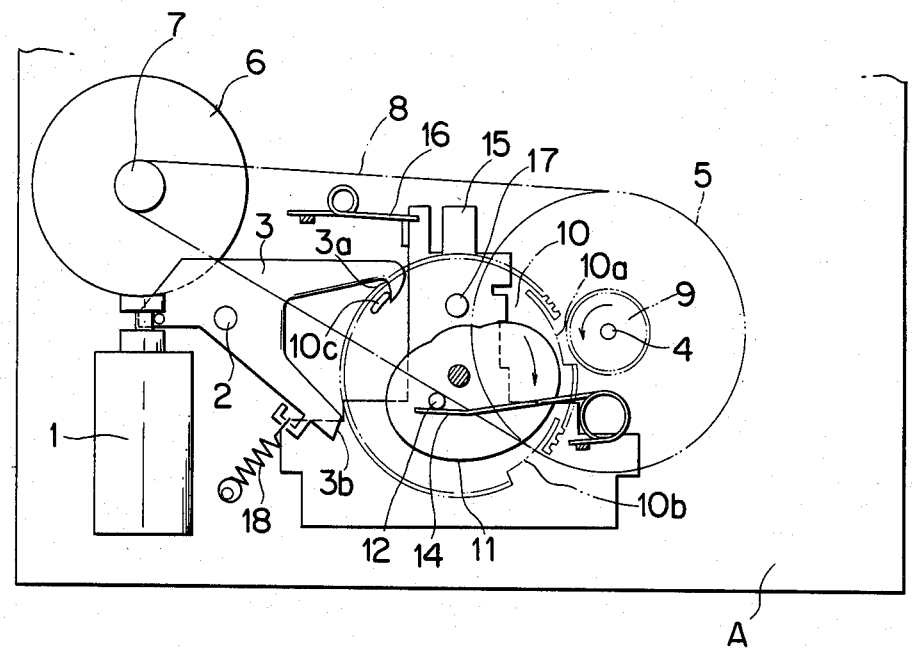
FIGS. 1 to 4 illustrate principles of a conventional head base drive mechanism in the order of operations.
Figure 2:
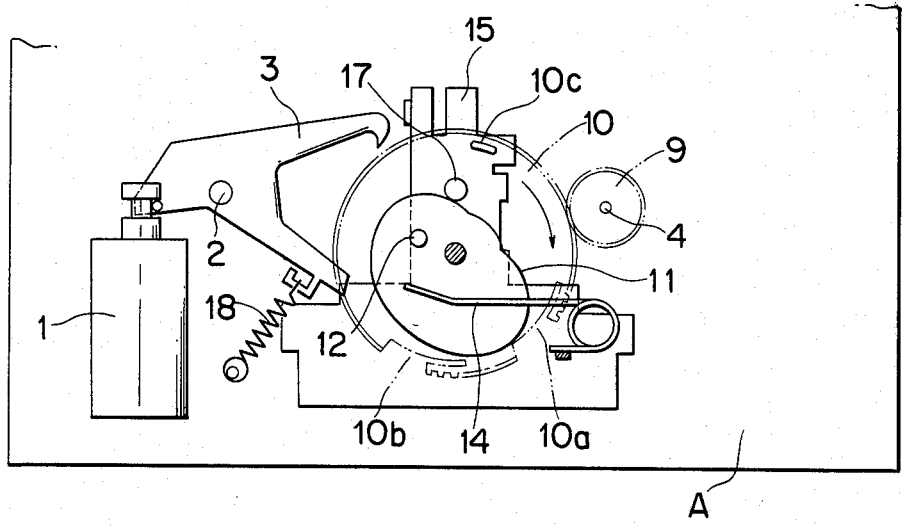
Figure 3:
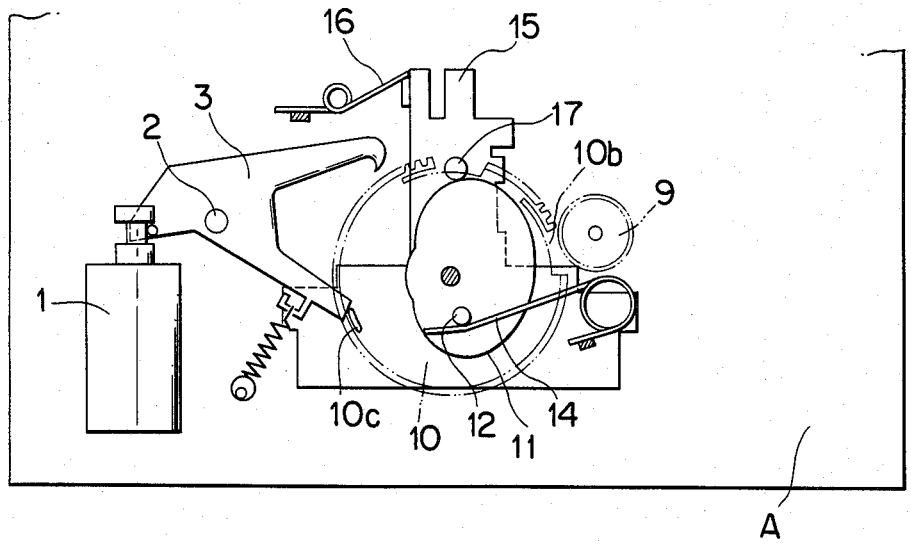
Figure 4:
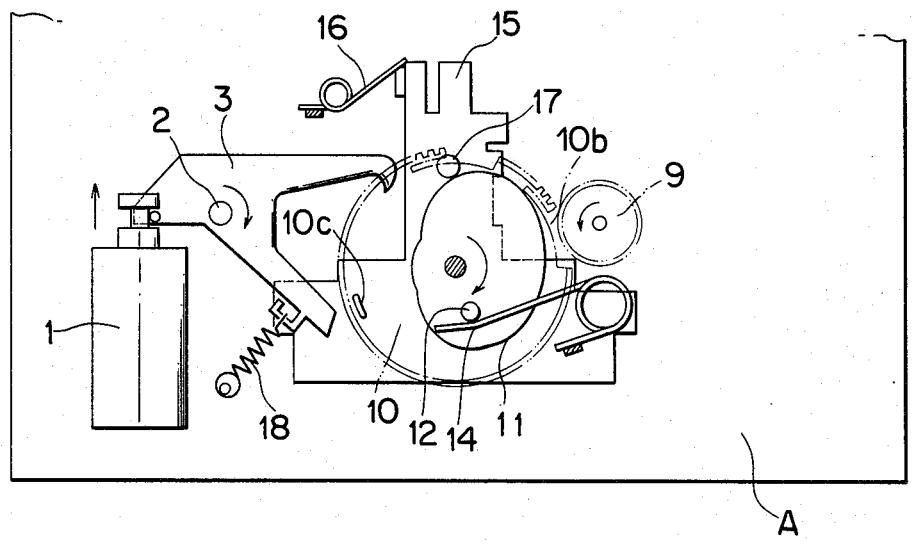
Figure 5:
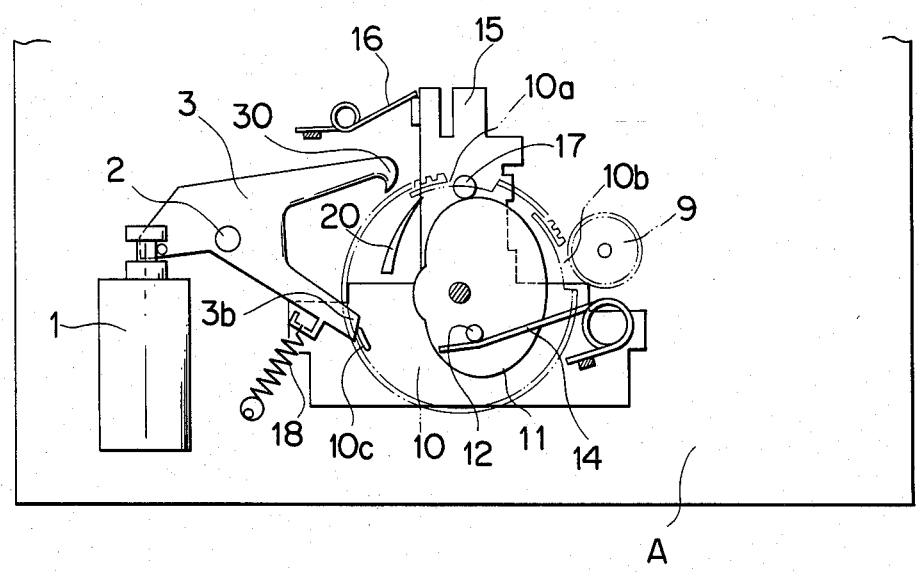
FIGS. 5 to 7 illustrate an embodiment of the present invention in the order of operations.

The present invention will be described hereinunder with respect to an embodiment thereof illustrated in FIGS. 5 to 7.

Although the general structure is substantially the same as the conventional mechanism shown in FIGS. 1 to 4, the cam gear 10 is additionally provided with an auxiliary cam 20 adapted to contact and actuate the drive pin 17 of the head base 15 for actuating the head base 15 to move away from the tape. Said auxiliary cam 20 is of substantially arcuate configuration fixed to said cam gear on a head-base-playback side of the drive pin 17 and has a camfollower-side profile increasing closer to a center of the cam gear 10 as said cam gear rotates to actuate the drive pin 17 toward the stop position of the head base 15. Said auxiliary cam 20 extends through an angular distance corresponding to a distance which said capstan gear 9 travels from the first notched section 10a to the second notched section 16b. In FIGS. 5 to 7, the same reference numerals as in FIGS. 1 to 4 represent the same portions.

Therefore, also in this embodiment, operation of the play button for tape recording and playback is followed by the same operation of each component as in the conventional device. Consequently the device assumes the state of FIG. 5. While the trigger plunger 1 is being energized, the head base 15 is held in the playback position by a suitable locking means with respect to the chassis.

Figure 6:
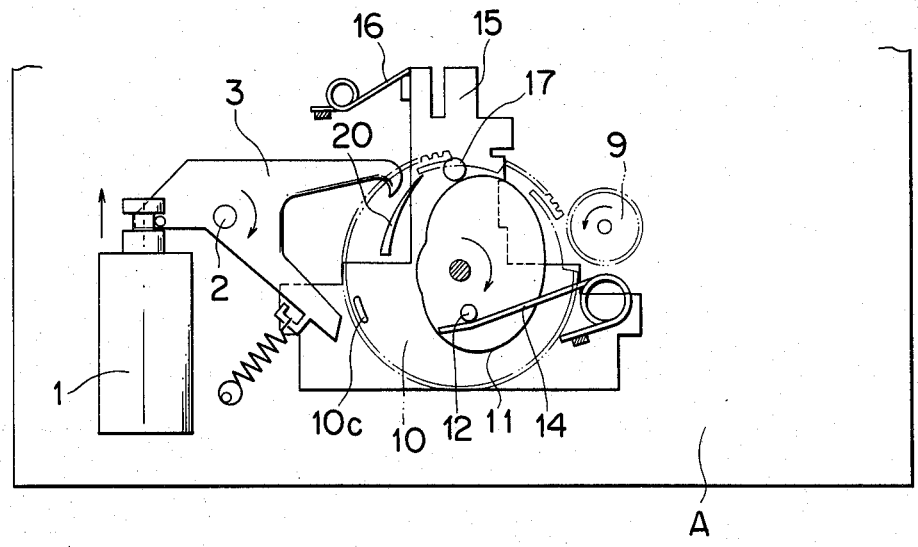

Next, when another button is operated for stopping recording or playback, the components perform the same operations as in the conventional device, and the cam gear 10 begins rotating as shown in FIG. 6.

Figure 7:
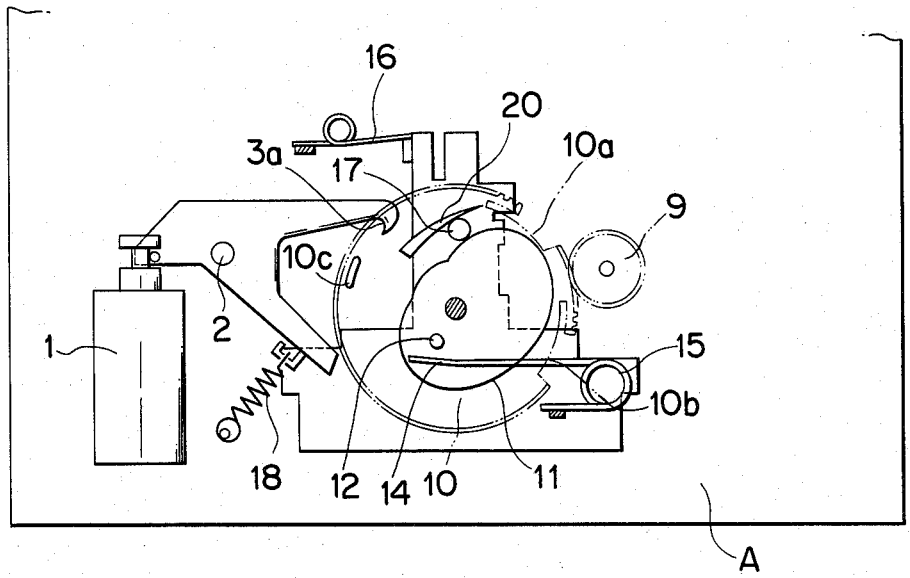

In this case, as soon as the head base 15 is pushed by the head base return spring 16 such that the drive pin 17 begins pressing the cam 11 to rotate the same, the cam 20 also contacts the drive pin 17 and assists the same to rotate the cam gear 10 as shown in FIG. 7.

When the movement of the head base 15 away from the tape is finished, the lug 10c of the cam gear 10 is retained by the retaining portion 3a of the trigger lever 3 to stop the rotation of the cam gear 10. Further, each component performs the same operation as in the foregoing and takes a stand-by position ready for the next play.

According to the present invention, as set forth hereinabove, the head base equipped with the head is actuated forcibly by the cam 20 in addition to being urged away from the tape by the spring 16, such that an extremely small force suffices as the spring urging force, thus minimizing of the resistance in moving the head base toward the tape. Consequently, not only the wear and breakage of each component part can be prevented, but also the head base can be moved away from the tape even in the event of an abnormal load applied to the head or the head base, thus preventing the cassette being trapped in the player.

What is claimed is:

1. A head base drive mechanism in a cassette tape player comprising
    a chassis;
    a head base slidable with respect to said chassis between a playback position and a stop position;
    a capstan mounted to said chassis and having a capstan gear coaxially fixed thereon;
    a cam gear having first and second notched sections therearound, said cam gear mounted to said chassis to come into mesh engagement with said capstan gear, said cam gear taking a first position when said first notched section faces the capstan gear and a second position when said second notched section faces the capstan gear;
    a cam follower fixed upon said head base;
    selective lock means for locking the cam gear at said first positon after releasing the same from the second position and for locking the cam gear at said second position after releasing the same from the first position;
    first resilient means to urge said head base toward the stop position;
    first cam means fixed on said cam gear to actuate said cam follower such that said head base is driven from the stop position to the playback position;
    second resilient means to urge said first cam when said cam gear takes said first and second positons such that said cam gear comes into mesh engagement with the capstan gear for said capstan gear to drive the head base from the stop position to the playback position by way of said first cam and said cam follower against the first resilient means;and
    second cam means fixed on said cam gear to actuate said cam follower such that said head base is driven from the playback position to the stop position.

2. A head base drive mechanism according to claim 1, wherein said first cam means includes a first cam of a generally oval shape having a substantially largest diameter section and a substantially smallest diameter section, said first cam fixed to the cam gear on a head-base-stop-position side of the cam follower such that said substantially smallest diameter section faces the cam follower when said first notched section faces the capstan gear and said substantially largest diameter section faces the cam follower when said second notched section faces the capstan gear.

3. A head base drive mechanism according to claim 1, wherein said second cam means includes a second cam of substantially arcuate configuration fixed to said cam gear on a head-base-playback-position side of the cam follower, said second cam having a cam-follower-side profile increasingly closer to a center of the cam gear as said cam gear rotates to actuate said cam follower toward the stop positon of the head base.

4. A head base drive mechanism according to claim 3, wherein said second cam extends through an angular distance corresponding to a distance which said capstan gear travels from the first notched section to the second notched section.

* * * * *